United States Patent [19]
Hutchinson

[11] 3,957,377
[45] May 18, 1976

[54] METHOD OF AND APPARATUS FOR SENSING THE POSITION OF A BODY

[75] Inventor: Terence Hutchinson, Belfast, Ireland

[73] Assignee: Short Brothers & Harland Limited, Belfast, Ireland

[22] Filed: Oct. 16, 1973

[21] Appl. No.: 406,864

[30] Foreign Application Priority Data
Oct. 17, 1972 United Kingdom............... 47835/72

[52] U.S. Cl............................. 356/152; 250/203 R; 350/274
[51] Int. Cl.²......................................... G01B 11/26
[58] Field of Search................ 250/203 R; 356/141, 356/152; 244/3.16; 350/266, 273, 274

[56] References Cited
UNITED STATES PATENTS

| | | | |
|---|---|---|---|
| 2,813,460 | 11/1957 | Wallin................................. | 350/274 |
| 3,423,591 | 1/1969 | Schrempp....................... | 250/203 R |
| 3,478,212 | 11/1969 | Turck............................. | 250/203 R |
| 3,662,180 | 5/1972 | Jorgensen et al.................. | 356/152 |

FOREIGN PATENTS OR APPLICATIONS

| | | | |
|---|---|---|---|
| 1,211,023 | 11/1970 | United Kingdom................. | 356/152 |

*Primary Examiner*—Maynard R. Wilbur
*Assistant Examiner*—S. C. Buczinski
*Attorney, Agent, or Firm*—Cushman, Darby & Cushman

[57] ABSTRACT

The position of a body is determined using a beam of electro-magnetic waves directed along a sight line generally towards the body. The cross-section of the beam is changed and a sensor mounted on the body senses these changes in cross-section and from the time periods in which electro-magnetic waves are received by the sensor two signals are produced in sequence, a first signal representative of a first co-ordinate position of the body within the cross-section of the beam and a second signal representative of a second co-ordinate position of the body within the cross-section of the beam.

24 Claims, 6 Drawing Figures

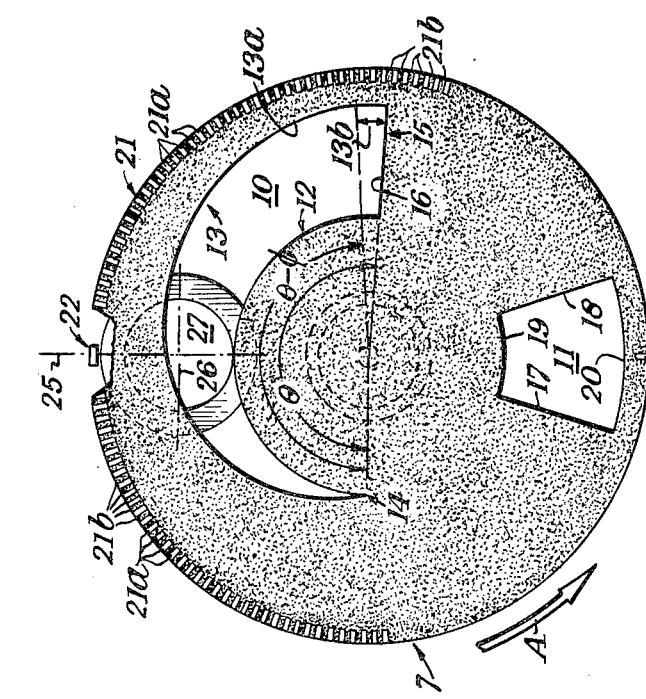
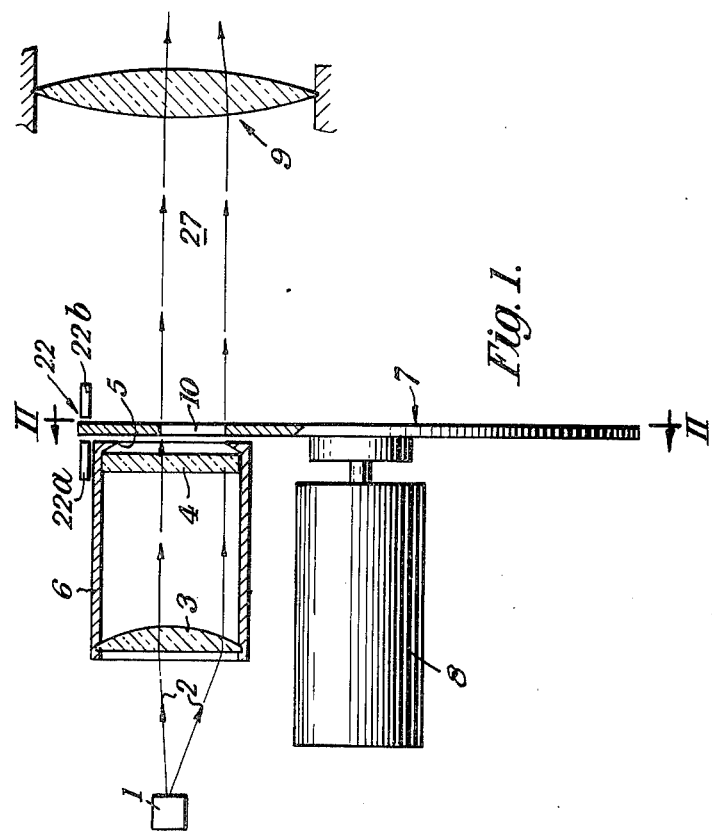
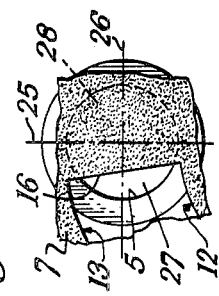
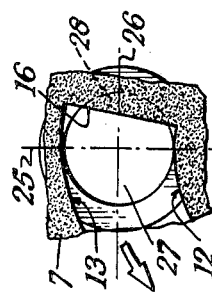
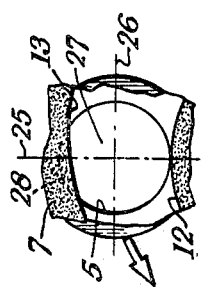
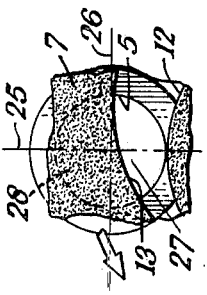

METHOD OF AND APPARATUS FOR SENSING THE POSITION OF A BODY

The present invention relates to a method of and apparatus for sensing the position of a body relative to a beam of electro-magnetic waves arranged on a sight line, there being relative movement between the body and the sight line.

According to a first aspect of the invention there is provided a method of determining the position of a body within the cross-section of a beam of electro-magnetic waves emanating from a source and arranged along a sight line, there being relative movement between the source and the body, comprising the steps of sensing the beam by a sensor on the body, and so modulating the beam that the sensor produces sequentially, and in response to the modulated beam, a first signal representative of a first co-ordinate of the position of the body within the cross-section of the beam, and a second signal representative of a second co-ordinate of the position of the body in the beam.

According to a second aspect of the present invention there is provided apparatus for determining the position of a body within the cross-section of a beam of electro-magnetic waves emanating from a source and arranged along a sight line there being relative movement between the body and the source, comprising a sensor for location on the body, and modulating means operative to so modulate the beam that in operation the sensor produces sequentially, and in response to the modulated beam, a first signal representative of a first co-ordinate of the position of the body within the cross-section of the beam, and a second signal representative of a second co-ordinate of the position of the body within the cross-section of the beam.

According to a third aspect of the invention there is provided a reticle for use in apparatus according to the second aspect of the invention.

According to a fourth aspect of the invention there is provided a missile guidance system incorporating apparatus according to the second aspect of the invention.

An embodiment of the invention will now be described by way of example only with reference to the figures of the accompanying drawings in which:

FIG. 1 is a schematic side view of an optical beam transmitting device of a position sensing apparatus, FIG. 2 is a front view of the reticle of the apparatus shown in FIG. 1, and FIGS. 3a, b, c and d are enlarged scrap views showing various positions of the reticle shown in FIG. 2.

Referring now to FIG. 1 an optical beam transmitting apparatus comprises a divergent laser source 1 providing a laser beam 2 which is collimated by a collimating lens 3. The collimated laser beam is partially diffused by a diffusing plate 4 or optical scrambler rod and passes as a substantially parallel beam through a fixed aperture 5. The fixed aperture 5 is provided in a housing 6 which has an interior matt black finish.

Arranged in front of the fixed aperture is a circular reticle 7 driven to rotate on an axis passing through its centre at constant angular velocity, by a motor 8. The reticle 7 is provided with windows which as the reticle rotates coincide with the aperture whereby the beam 2 passes through the windows to a main optical system indicated by a lens 9 which focuses the laser beam 2 as required.

The windows in the reticle 7 are shown in FIG. 2 and it will be seen that they consist of a modulating window 10 which is substantially wedged shaped and which extends in a circumferential direction around the reticle 7, and a reference window 11. The reticle 7 as viewed in FIG. 2 is arranged to rotate in an anticlockwise direction as indicated by arrow A.

The modulating window 10 is defined by a part-circular radially inner edge 12 which has a fixed radius of curvature and which is concentric with respect to the rotational axis of the reticle 7, and a curved radially outer edge 13 having a portion 13a which has a radius of curvature which gradually decreases towards the leading end 14 of the modulating window 10 and a portion 13b at the trailing end 15 of the modulating window 10, which portion 13b has a fixed radius of curvature, and is concentric with the rotational axis of the reticle 7. The portion 13a is preferably defined by a part of a spiral having a centre coinciding with the rotational axis of the reticle 7. The portion 13a of the outer edge 13 merges at the leading end 14 with the radially inner edge 12, and the curved radially inner edge 12 and the portion 13b of the outer edge 13 are joined at the trailing end 15 by a radially extending edge 16 which acts as a terminator to the modulating window 10.

The reference window 11 of the reticle 7 has its leading and trailing ends defined by radially extending edges 17 and 18, and the radially extending edges 17 and 18 are joined at their radially inner and outer ends by part-circular edges 19 and 20 which have a fixed radius of curvature and which are concentric with respect to the rotational axis of the reticle 7. Alternatively the shape of the reference window 11 could be circular such that it fully exposes the aperture 5 during each rotation of reticle 7.

A stroboscopic pattern 21 consisting of alternate opaque and transparent regions 21a and 21b is provided around the periphery of the reticle 7 and this co-operates with a laser trigger 22. The laser trigger 22 consists of a light source 22a and a light sensor 22b so that as the reticle rotates the light sensor 22b receives pulsed light signals caused by modulation of light from the light source 22a by the stroboscopic pattern 21. The sensor produces, in response to the pulsed light signals, a pulsed output signal which triggers a solid state switch to intermittently connect a source of high power to the laser source 1 to produce corresponding pulses of the laser beam 2. The stroboscopic pattern 21 extends only around that part of the periphery of the reticle 7 which corresponds to the modulating window 10, so that as the reticle 7 rotates the laser beam 2 is only pulsed as the modulating window 10 passes the fixed aperture 5.

Since there is no stroboscopic pattern on the remaining part of the periphery of the reticle 7, as this part passes the aperture 5 the laser source is switched off.

A second stroboscopic pattern 23 is provided on the periphery of the reticle 7 adjacent the reference window 11, and this second stroboscopic pattern 23 co-operates with the laser trigger 22 to produce a single reference pulse of the laser beam 2 when the fixed aperture 5 is completely opened by the reference window 11. The stroboscopic pattern 23 may however operate to provide more than one reference pulse.

The reticle 7 is made of transparent glass and the windows 10 and 11, and stroboscopic patterns 21 and 23 are formed by rendering the remainder of the reticle opaque with a coating of chrome or other opaque material. The glass in the region of the windows 10, 11 is also coated for maximum transmission in the spectral band of the laser beam 2.

The detecting apparatus is particularly suitable for use with missile guidance systems and operation of the apparatus will be described with reference to such a system.

In operation the laser beam 2 is directed at a target and a missile is fired into the beam 2. The missile carries at its rear end a sensor which is operative to sense the laser beam modulated by the rotating reticle 7, and feed signals in response thereto to a control device which produces sequentially a first signal dependent on the co-ordinate of the position of the missile within the crosssection of the beam along the pitch axis 25 and a second signal corresponding to the co-ordinate of the position of the missile within the cross-section of the beam along the yaw axis 26.

The beam is modulated by rotating the reticle 7 at a predetermined speed in front of the fixed aperture 5 so that during a first phase of each revolution of the reticle, as the modulating window 10 passes the fixed aperture 5 the radially outer edge 13 of the modulating window 10 sweeps across the fixed aperture 5 in a substantially radial direction of the reticle 7 and progressively opens the aperture 5. This will more clearly be seen in FIGS. 3a and 3b, in which FIG. 3a shows a position in which approximately a third of the fixed aperture 5 has been opened by the modulating window 10 whilst FIG. 3b shows the position of the radially outer edge 13 at a later instant of time after further revolution of the reticle 7 when the fixed aperture 5 has been almost completely opened by the modulating window 10. During the period when the modulating window 10 sweeps across the fixed aperture 5 the stroboscopic pattern 21 co-operates with the laser trigger 22 to pulse the laser beam 2.

As the radially outer edge 13 of the modulating window 10 gradually sweeps across the fixed aperture 5 the area 27 of the cross-section of the beam 2 which reaches the target zone via the modulating window 10 and the aperture 5 gradually increases and there comes a point, dependent on the position of the missile, when the missile lies in the area 27 of the beam 2 passing to the target zone. At this point the sensor on the missile begins to receive the beam pulses, and actuates the control device to commence counting the pulses as the aperture 5 continues to be opened by the radially outer edge 13 of the modulating window 10. When the aperture 5 has been fully opened the radially extending edge 16 at the trailing end of the modulating window 10 begins to move in a substantially circumferential direction across the fixed aperture 5 thereby progressively closing the aperture 5 and decreasing the area 27 of the cross-section of the beam 2 passing via the modulating window 10 and aperture 5 to the target zone. The position of the radially inner edge 12 of the modulating window 10 is such that it never sweeps across the fixed aperture 5. This is clearly seen in FIGS. 3c and 3d in which FIG. 3c shows the edge 16 at a position in which a small area 28 of the beam is cut off and FIG. 3d shows the edge 16 after a further interval of time at which a larger area 28 of the beam is cut off. As the radially extending edge 16 sweeps across the aperture 5 there comes a point where the image of edge 16 passes across the missile thus the sensor no longer receives the beam pulses.

The number of pulses counted by the control device, as the modulating window 10 passes the fixed aperture 5, is dependent on the time period during which the sensor picks up light from the laser beam during the first phase and is representative of the co-ordinate of the position of the missile on the pitch axis 25.

During the period in which the fixed aperture 5 is blocked by the opaque part of the reticle 7 the laser source 1 is switched off by the laser trigger 22 until such time as the reference window 11 has completely opened the aperture 5 during a second phase of each revolution of the reticle 7. When the aperture 5 has been completely opened by the reference window 11, the stroboscopic pattern 23 co-operates with the laser trigger 22 to cause the laser source 1 to produce a reference signal in the form of single or double reference beam pulse which is sensed by the sensor. The control device calculates the time period which has elapsed between the last of the number of beam pulses received by the sensor during opening of the aperture 5 by the modulating window 10 and the reference beam pulse, and this time period represents the co-ordinate of the position of the missile along the yaw axis 25.

The two co-ordinates provide a measure of the position of the missile within the cross-section of the beam 2 and once this has been calculated the missile can be controlled to move towards the centre of the beam 2. The minimum number of pulses in one extrement of the missile pitch position is never less than the number of reference pulses, the latter being preferably one or two and the former being 10 or over.

The resolution of the detecting apparatus in the pitch axis ultimately depends on the spatial rate-of-change of the number of pulses counted for each scan by the modulating window 10 across the aperture 5 and will be as high as the other factors of the position sensing system permits.

If the angular frequency of the scan of the modulating window 10 across the aperture 5 is w rads/sec. and the pulse repetition frequency of the laser beam is f pulses per second, there will be f/w pulses per radian with respect to the centre of the reticle 7. If the maximum angular subtence of the modulating window 10 to the centre of the reticle 7 is $\theta$ radians then the maximum number of pulses per scan which may be received is $\theta f/w$ pulses. If the angular subtence of the part of the modulating window 10 bounded on the outer edge 13 by the concentric portion 13b is $\phi$ radians then the minimum number of pulses which may be received is $\phi f/w$ pulses. This minimum number must always greatly exceed 2. The resolution is given in radians per unit change in the number of pulses counted per scan, and if the maximum total angle of the transmitted beam is 2B radians then the resolution in the pitch axis 25 is $2B$ $W/(\theta - \phi)f$ rads. It is clear that the element of resolution increases with the increase of beam angle 2B and with the angular frequency w and decreases, that is, improves, with increase in the difference between the total angular substence of the modulating window 10 ($\theta$) and the concentric portion 13b ($\phi$) to the centre of the reticle 7.

Considering now the resolution in the yaw axis; let the maximum angular subtense of the diameter of the fixed aperture 5 to the centre of the reticle 7 be $2\alpha$ (i.e. $\tan\alpha = R/x$ where R = radius of aperture 5 and x= distance between centre of aperture 5 and reticle centre.) The resolution in the yaw axis will be proportional to the angle through which the reticle 7 turns between pulses, that is w/f radians. Since the angular subtense of the diameter of the fixed aperture 5 represents the beam angle 2B then the factor of proportionality is B/α. The resolution along the yaw axis is hence approximately Bw/αf rads.

The invention has particular advantages in that processing of the signals produced is much simplified, and the same beam can be used to control several missiles simulatneously.

Furthermore, when a sensor is on the sight line, i.e. the axis of the beam, strong signals are produced. This is advantageous over, for example, systems using a reticle consisting of spokes radiating from the centre of a circle which produce noisy signals when the sensor is on the sight line.

It will be realised that the shuttering means need not be a rotating reticle but may be defined by any other shutter which operates to modulate the cross-section of the beam sequentially in two co-ordinate directions. An example of an alternative shutter may be a closed film loop having a wedge shaped window. It will also be realised that the reference signal need not be provided by a reference pulse of the beam, but may be provided by an external device not associated with the reticle. Furthermore the reticle may be arranged in some circumstances such that it does not completely block off the beam but merely changes a characteristic for example intensity or colour of the beam. Thus the opaque regions may be replaced by a translucent or coloured transparent region.

What we claim is:

1. A method of determining the position of a body relative to a sight line comprising the steps of projecting a beam of electro-magnetic waves of a predetermined characteristic from a source along the sight line while maintaining the beam in a fixed direction along the sight line, modulating the fixed beam cyclically with modulating means between the source and the body with each cycle of modulation including a phase in which the cross-sectional area of the beam is varied in a first co-ordinate direction relative to the sight line and a phase in which the crosssectional area is varied in a second co-ordinate direction relative to the sight line, the variation of cross-sectional area of the beam in both co-ordinate directions being between a position in which no part of the beam passes the modulating means and a position in which a maximum crosssectional area of the beam passes the modulating means, sensing with a sensor of said electro-magnetic waves mounted on the body, the time periods in which the beam of electro-magnetic waves is of sufficient cross-sectional area to be received by the sensor and producing sequentially, from said time periods, a first signal representative of a first co-ordinate of the position of the body within the cross-section of the beam, and a second signal representative of a second co-ordinate of the position of the body in the cross-section of the beam.

2. Position determining apparatus comprising a beam of electro-magnetic waves projected along a sight line towards a body, the position of which, relative to the sight line, is to be determined, with the beam remaining fixed in direction relative to the sight line, mechanical shuttering means disposed between the source and the body which cyclically vary the cross-sectional area of the beam, means for moving the mechanical shuttering means relative to the beam, said mechanical shuttering means having an opaque portion which, during a first phase of each cycle, blocks the beam to prevent any part of the beam passing the mechanical shuttering means, said mechanical shuttering means further including a first means defining an opening for the beam which, during the first phase of each cycle, sweeps across the beam to vary the cross-sectional area of the beam in a first co-ordinate direction between a position in which the beam is interrupted and a position in which the beam has a maximum cross-sectional area, said mechanical shuttering means further including a second means defining a second opening for the beam which, during a second phase of each cycle, sweeps across the beam to vary the cross-sectional area of the beam in a second co-ordinate direction between a position in which the beam is interrupted and a position in which the beam has the maximum cross-sectional area, pulsing means for pulsing the beam at least when the beam passes said mechanical shuttering means, means for producing a reference signal during said second phase of each cycle, sensor means mounted on the body to sense the pulses received during said first phase and also sense the said reference signal during said second phase and which produces a first signal representative of the position of the body in the first coordinate direction, said first signal being based on the time periods in which the pulses are received and the reference signal, said sensor means also producing a second signal representative of the position of the body in the second co-ordinate direction.

3. Apparatus for determining the position of a body relative to a sight line comprising a source of electromagnetic waves of a predetermined characteristic which projects a beam of electro-magnetic waves in a fixed direction along the sight line between the source and a point on the sight line adjacent the body, modulating means disposed adjacent the source and between the source and the body which modulate the cross-sectional area of the beam cyclically, said modulating means including a first means for, in one phase of each cycle, varying the cross-sectional area of the beam in a first co-ordinate direction relative to the sight line between a position in which no part of the beam passes the modulating means and a position in which a maximum cross-sectional area of the beam passes the modulating means, said modulating means also including a second means for, in another phase of each cycle, varying the cross-sectional area of the beam in a second co-ordinate direction relative to the sight line between a position in which no part of the beam passes the modulating means and a position in which the maximum cross-sectional area of the beam passes the modulating means, sensing means mounted on the body for sensing the time periods in which the cross-sectional area of the beam of electro-magnetic waves is sufficient to be received by the sensor and which produce, sequentially from said time periods, a first signal representative of the position of the body in the first co-ordinate direction and the second signal representative of the position of the body in the second co-ordinate direction.

4. Apparatus as claimed in claim 3 wherein the first means included in the modulating means in the first co-ordinate direction increases the cross-section of the beam passing to the sensor, and the second means included in the modulating means in the second co-ordinate direction decreases the cross-section of the beam passing to the sensor.

5. A reticle for use with the apparatus claimed in claim 3 comprising a circular disc having a modulating window and a reference window, the modulating window having an inner edge merging at one end thereof with a curved outer edge, the inner and outer edges being connected at the other end thereof by a radially extending edge and the radially outer edge including a portion which increases in radius of curvature from the said one end to the other.

6. A reticle as claimed in claim 5 wherein the said portion is in the form of a part of a spiral having a centre coinciding with the centre of the disc.

7. A reticle as claimed in claim 5 wherein the outer edge has a further portion at the said other end of the modulating window, the further portion being of fixed radius of curvature and being concentric with the centre of the disc.

8. A reticle as claimed in claim 5 wherein the circular inner edge is of fixed radius of curvature and is concentric with the centre of the disc.

9. A reticle as claimed in claim 5 wherein a stroboscopic pattern is provided on the periphery of the disc adjacent the modulating window.

10. A reticle as claimed in claim 5 wherein a stroboscopic pattern is provided on the periphery of the reticle adjacent the reference window.

11. A missile guidance system incorporating apparatus as claimed in claim 3.

12. Apparatus as claimed in claim 3 wherein said modulating means comprises a mechanical shuttering means including an opaque portion which during said one phase firstly interrupts the beam and prevents electro-magnetic waves from passing to the sensor, and also includes said first means which during said one phase sweeps across the beam in the first co-ordinate direction to gradually increase to a maximum the cross-section of the beam passing to the sensor and further includes said second means which during said one phase sweeps across the beam in the second co-ordinate direction to gradually decrease the cross-section of the beam passing to the body until the beam is completely interrupted, said mechanical shuttering means further including reference signal producing means which during a second phase, provides at least one reference pulse of the beam at a predetermined instant of time after termination of the said one phase, whereby the first signal is dependent on the time period during which the sensor receives electro-magnetic waves during said one phase, and the second signal is dependent on the period of time between the instant of time at which the sensor stops receiving electro-magnetic waves during said one phase and the instant of time at which it senses the reference signal period.

13. Apparatus as claimed in claim 12 wherein the modulating window includes an inner edge and a curved radially outer edge which merge at the leading end of the window, taken in the direction of the rotation of the reticle, and which are connected by a radially extending edge at the trailing end of the window, the outer edge having a portion whose radius of curvature gradually increases from the leading end towards the trailing end of the window whereby on rotation of the reticle the outer edge sweeps across the beam in a substantially radial direction of the reticle to gradually increase the cross-section of the beam passing to the sensor, and subsequently the radially extending edge sweeps across the beam in a substantially circumferential direction of the reticle to gradually decrease the cross-section of the beam and interupt it.

14. Apparatus as claimed in claim 13 wherein the said portion is defined by part of a spiral having a centre coinciding with the rotational axis of the reticle.

15. Apparatus as claimed in claim 13 wherein the outer edge has a further portion at the trailing end of the window, which further portion is of fixed radius of curvature and is concentric with the rotational axis of the reticle.

16. Apparatus as claimed in claim 13, or/wherein the inner edge of the modulating window has a fixed radius of curvature and is concentric with the axis of rotation of the reticle.

17. Apparatus as claimed in claim 13 wherein the fixed aperture is circular and the length of the radially extending edge is at least equal to the diameter of the fixed aperture.

18. Apparatus as claimed in claim 12 wherein the mechanical shuttering means includes a fixed aperture through which the beam is directed and a reticle rotatably mounted in front of the aperture, the reticle having a modulating window which defines the first and second means and which, on rotation of the reticle, modulates the beam during the one phase and also includes a reference window which defines the first and second means which, on rotation of the reticle, modulates the beam during the second phase to produce at least one reference pulse of the beam.

19. Apparatus as claimed in claim 18 wherein the size of the reference window is such that when the reference window is in alignment with the fixed aperture, no part of the beam passing through the fixed aperture is intercepted by the reticle, and wherein pulsing means are provided to produce at least one reference pulse of the beam when the reference window is in alignment with the fixed aperture.

20. Apparatus as claimed in claim 19 wherein the reference window includes inner and outer edges of fixed radius of curvature and arranged concentrically with respect to the rotational axis of the reticle, the inner and outer edges being connected at both the leading and trailing ends of the reference window, when taken in the direction of rotation of the reticle, by radially extending edges.

21. Apparatus as claimed in claim 19 wherein the pulsing means includes a stroboscopic pattern on the periphery of the reticle adjacent the reference window and a detector means operative to sense the stroboscopic pattern and pulse the source in response thereto to provide the reference pulse of the beam.

22. Apparatus as claimed in claim 21
wherein the pulsing means includes a further stroboscopic pattern on the periphery of the reticle adjacent the modulating window, and wherein the detector means is operative to detect the stroboscopic pattern and to pulse the source during the first phase, the apparatus further including a control device operative to count the number of pulses received by the sensor during the first phase whereby to determine the first time period.

23. Apparatus as claimed in claim 22 wherein the further stroboscopic pattern is operative to switch off the source at the end of the first phase.

24. Apparatus as claimed in claim 21, wherein the detector device includes a photo-electric detector operative, in response to a beam of light passing through the stroboscopic patterns to produce a pulsed output signal for pulsing the source.

* * * * *